United States Patent
Li et al.

(10) Patent No.: US 11,443,225 B2
(45) Date of Patent: Sep. 13, 2022

(54) SYSTEMS AND METHODS FOR INTELLIGENTLY PROVIDING SUPPORTING INFORMATION USING MACHINE-LEARNING

(71) Applicant: Oracle International Corporation, Redwood Shores, CA (US)

(72) Inventors: Li Li, Beijing (CN); Xiaoyu Peng, Beijing (CN); Kehua Pan, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 892 days.

(21) Appl. No.: 15/485,516

(22) Filed: Apr. 12, 2017

(65) Prior Publication Data

US 2018/0285777 A1     Oct. 4, 2018

Related U.S. Application Data

(63) Continuation of application No. PCT/CN2017/078401, filed on Mar. 28, 2017.

(51) Int. Cl.
*G06N 20/00* (2019.01)
*H04L 67/50* (2022.01)
(Continued)

(52) U.S. Cl.
CPC .............. *G06N 20/00* (2019.01); *G06N 5/04* (2013.01); *G06N 5/045* (2013.01); *G06Q 10/02* (2013.01);
(Continued)

(58) Field of Classification Search
CPC .......... G06N 20/00; G06N 5/04; G06N 5/045; G06Q 10/02; G06Q 10/06; H04L 67/18; H04L 67/22
See application file for complete search history.

(56) References Cited

U.S. PATENT DOCUMENTS

2003/0120526 A1* 6/2003 Altman ................. G06Q 10/02
705/5
2005/0227676 A1* 10/2005 De Vries ................ H04L 29/06
455/414.1

(Continued)

FOREIGN PATENT DOCUMENTS

CN            101782976          7/2010

OTHER PUBLICATIONS

Harrison et al. ("The Impact of RAC Audits on US Hospitals", Journal of Health Care, vol. 39, No. 4, Summer 2013, pp. 1-14) (Year: 2013).*

(Continued)

*Primary Examiner* — Brian M Smith
*Assistant Examiner* — Robert Lewis Kulp
(74) *Attorney, Agent, or Firm* — Kilpatrick Towsend & Stockton LLP

(57) ABSTRACT

Systems and methods for intelligently providing users with supporting information based on big-data analyses of a data set. Machine-learning algorithms may be executed using the data set to identify correlations between data objects of the data set. The correlations can be used to recommend supporting information to a user. A user interface can be provided to enable a user to initiate a process associated with an event. In response to receiving the input, the system can identify variables associated with the request. Based on these variables, the system can retrieve output data of the machine-learning algorithms to identify the supporting information for the user.

22 Claims, 6 Drawing Sheets

(51) Int. Cl.
  *G06Q 10/06* (2012.01)
  *G06Q 10/02* (2012.01)
  *G06N 5/04* (2006.01)
  *H04L 67/52* (2022.01)
(52) U.S. Cl.
  CPC ............ *G06Q 10/06* (2013.01); *H04L 67/22* (2013.01); *H04L 67/18* (2013.01)

(56) References Cited

U.S. PATENT DOCUMENTS

| | | | |
|---|---|---|---|
| 2012/0185275 A1* | 7/2012 | Loghmani | G06F 19/328 705/3 |
| 2014/0149129 A1* | 5/2014 | Getchius | G06Q 50/22 705/2 |
| 2015/0356416 A1* | 12/2015 | Faith | G06N 20/00 706/46 |
| 2015/0379429 A1 | 12/2015 | Lee et al. | |
| 2016/0162945 A1* | 6/2016 | Turner | G06Q 50/14 705/14.57 |
| 2016/0358099 A1 | 12/2016 | Sturlaugson et al. | |

OTHER PUBLICATIONS

International Application No. PCT/CN2017/078401, International Search Report and Written Opinion dated Jan. 4, 2018, 11 pages.

* cited by examiner

SYSTEMS AND METHODS FOR INTELLIGENTLY PROVIDING SUPPORTING INFORMATION USING MACHINE-LEARNING

CROSS-REFERENCES TO RELATED APPLICATIONS

This application is a continuation of International Application No. PCT/CN2017/078401, filed Mar. 28, 2017, entitled "SYSTEMS AND METHODS FOR INTELLIGENTLY PROVIDING SUPPORTING INFORMATION USING MACHINE-LEARNING," the entire disclosure of which is incorporated by reference in its entirety for all purposes.

FIELD

The present disclosure relates generally to systems and methods for intelligently providing users with supporting information. More specifically, the present disclosure relates to systems and methods for applying machine-learning techniques to historical expense data to intelligently provide the supporting information.

BACKGROUND

Employees often travel for their employers. During travel, expenses may be incurred. Systems for requesting reimbursement are generally burdensome and inefficient. For example, protocols defined by employers may be unknown to users or difficult to access. Further, determining aspects of the travel (e.g., schedules) may be time consuming.

SUMMARY

Certain aspects and features of the present disclosure relate to systems and methods for intelligently providing users with supporting information based on big-data analyses of a stored data set (e.g., historical expense data). Machine-learning algorithms may be executed using the stored data set to identify correlations between data objects within the data set. The correlations can be used to identify supporting information for users. In one embodiment, a user interface can be provided to enable a user to initiate a process associated with an event (e.g., a travel event). Examples of initiating a process associated with an event can include defining an event (e.g., reserving a flight), requesting an offset (e.g., reimbursement), requesting documentation relating obtaining the offset, and so on. The event may have previously occurred or may be set for a future time. The user interface can receive an input from a user device. For example, the input can correspond to a request to initiate a process associated with a future event (e.g., requesting to define an event). In response to receiving the input, the system can identify (e.g., generate or select) variables associated with the request (e.g., current location of the user device, target location of the event, etc.). The system can map the variables to a machine-learning model, which includes a plurality of nodes and one or more correlations between at least two nodes. Based on the mapping and the one or more correlations, the system can intelligently predict or recommend supporting information specific to the user's request. Metadata can be retrieved from additional sources to supplement the supporting information. Examples of supporting information can include specific documents, third-party data, schedules, an identification of other users, recommendations, etc.

In another embodiment, a centralized repository can store data objects (e.g., expense reports) received from various user devices. For example, a first user device can transmit a first data object (e.g., a booked flight to a particular city) at a first time to the centralized repository, and a second user device can transmit a second data object (e.g., a request to book a flight to the particular city) at a second time (after the first time) to the centralized repository. When the system receives the second data object, the system can detect a correlation between the second data object and the first data object. For example, the correlation can be detected when each of the first data object and the second data object corresponds to an event in a particular location (e.g., a flight to the same city). Upon detecting the correlation, the system can transmit a notification message (e.g., via a pop-up window, push notification in a native application, information toolbox, text message, web user interface (UI), etc.) to the second user device. Additional information can be transmitted to the first user device and/or the second user device. The additional information can include, for example, an alert indicating 30% of other users (e.g., employees) who previously booked that flight perform one or more first actions (e.g., eat at a particular restaurant). The alert can also indicate that 70% of other users who previously booked that flight perform one or more second actions (e.g., took a train). In some instances, the alert can indicate which of the one or more first actions or the one or more second actions are preferred.

In some embodiments, a computer-implemented method is provided. The method can include collecting a data set for generating a machine-learning model using one or more machine-learning algorithms. The data set can include one or more events that have previously occurred. Each event of the one or more events can correspond to one or more event parameters that identify a characteristic of the event. The method can also include defining one or more evaluation metrics using the one or more event parameters. Each evaluation metric can be used to classify the one or more events into an event type. Further, the method can include assessing the one or more evaluation metrics and the data set. Assessing can include executing the one or more machine-learning algorithms to generate the machine-learning model. The execution of the one or more machine-learning algorithms can generate a plurality of nodes and one or more correlations between at least two nodes of the plurality of nodes. Each node can represent a value associated with an event and corresponding to a weight. A first communication from a computing device can be detected. The first communication can be associated with a user and can correspond to a request to initiate a process associated with a particular event. In response to detecting the first communication, one or more variables can be determined from the request. For example, each variable of the one or more variables can represent a characteristic of the particular event. The one or more variables can be mapped to the plurality of nodes of the machine-learning model. Based at least in part on the mapping, one or more nodes for each of the one or more variables can be identified. The one or more nodes can be included in the plurality of nodes of the machine-learning model. Further, the one or more nodes can be identified using the one or more correlations. One or more values associated with each of the nodes included in the one or more nodes can be retrieved. A second communication can be transmitted to the computing device. For example, the second communication can be responsive to the first communication and can include at least one of the retrieved one or more values.

In some embodiments, a computer-program product is provided that is tangibly embodied in a non-transitory machine-readable storage medium. The computer-program product can include instructions configured to cause one or more data processors to perform part or all of a method disclosed herein. In some embodiments, a system is provided. The system can include one or more data processors and a non-transitory computer readable storage medium containing instructions which, when executed on the one or more data processors, cause the one or more data processors to perform part or all of a method disclosed herein.

Advantageously, embodiments of the present disclosure relate to using the stored data objects (e.g., stored, previously-received data object) previously submitted by various user devices as a data set to train or generate machine-learning models using one or more machine-learning algorithms. The trained or generated models can be accessed to recommend supporting information (e.g., documentation or other related informational materials, such as a train schedules, map information, or a link for those users with anticipated train bookings). Notably, the supporting information can be automatically attached to event records (e.g., expense entries) associated with particular entities (e.g., a train company) or locations (e.g., a destination city) by mapping the event record to those entities or locations (e.g., using text analysis in the image of a receipt), and having a separate mapping from entities or locations to supporting information.

The following detailed description together with the accompanying drawings will provide a better understanding of the nature and advantages of the present disclosure.

BRIEF DESCRIPTION OF THE DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Figure 1:
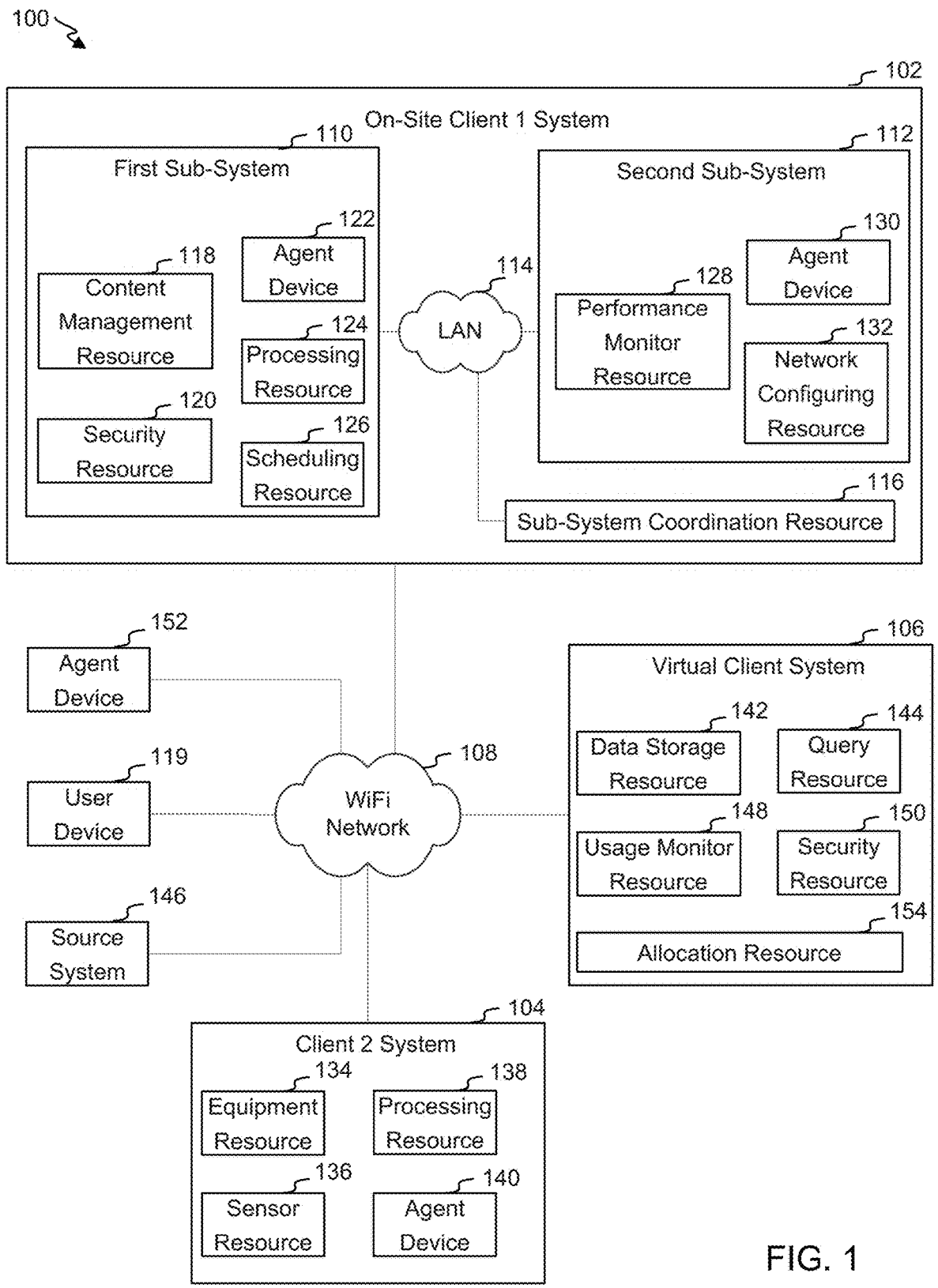
FIG. 1 shows an example network for controlling resource access and operation across sub-systems and/or systems.

FIG. 1 shows an example network 100 for controlling resource access and operation across sub-systems and/or systems. Network 100 includes systems corresponding to multiple clients and to multiple locations. More specifically, each of on-site client 1 system 102, virtual client system 106 and client 2 system 104 can correspond to a set of devices and/or other components, such as one or more servers (e.g., and/or server farms or server clusters), user devices (e.g., desktop computers, laptops, tablets, or smart phones), data storage devices (e.g., network-attached storage), and/or equipment. The set of devices and/or other components can, in some instances (e.g., for on-site client 1 system), be co-located, such as being located within one or more buildings or geographical areas associated with the client. In some instances, the clients need not be co-located but are connected via a network (e.g., a private network). In instances where different parts of a given client's system are at different locations (e.g., part being at an on-site location and part being virtual), the systems may communicate via a network, such as a WiFi network 108.

A system can include multiple sub-systems. Each of the multiple sub-systems may (for example) be configured to perform a different type of operation, to use different resources (and/or different types of resources), to generate different types of outputs, to be located at different geographical locations, to correspond to (e.g., to grant access to) different agents or users (e.g., to different departments of an organization), and so on. For example, on-site client system 102 can include a first sub-system 110 and a second sub-system 112. First sub-system 110 can be configured to receive and respond to requests from user devices for content, and second sub-system 112 can be configured to dynamically monitor and re-configure network resources. First sub-system 110 and second sub-system 112 may communicate via WiFi network 108 or a local area network 114. Each of first sub-system 110 and second sub-system 112 can further communicate with a sub-system coordination resource 116. Sub-system coordination resource 116 may process data from each of one or more sub-systems to (for example) determine whether operation at one sub-system is consistent with operation at another sub-system or with system-level policies and/or to determine how one or more resources are to be allocated to a sub-system.

The implementation depicted in FIG. 1 illustrates various types of resources of systems. It will be appreciated that these resources are illustrative. Resources represented by separate blocks may, but need not, correspond to separate devices or groups of devices.

In the depicted instance, first sub-system 110 includes a content management resource 118, which is configured to query one or more data stores for content responsive to content requests and to transmit responses to content requests. For example, content management resource 118 may be configured to receive HTTP requests from a user device 119 and respond with webpage data. First sub-system 110 can further include a security resource 120, which may be configured to determine what data various users are authorized to receive and/or what types of actions various agents are authorized to make. For example, security resource 120 may receive or intercept a request from an agent device 122 to add or modify data in a content data store (e.g., stored locally at first sub-system 110 or remotely) and to determine whether such an addition or modification is allowed (e.g., based on an authentication of agent device 122 and/or information associated with the request).

First sub-system 110 also includes a processing resource 124, which can be configured to perform data processing, such as processing retrieved content (e.g., to convert it from a first to a second format or identifying particular content objects to retrieve in response to a request). First sub-system 110 further includes a scheduling resource 126, which may monitor incoming requests and identify when each request is to be processed (e.g., by managing a request queue).

Second sub-system 112 includes a performance monitor resource 128, which may assess a data log corresponding to requests being handled by first sub-system 110. The assessment may include monitoring a speed at which the requests are processed and an error rate. Results of the assessment can be transmitted to another agent device 130. A network configuring resource 132 can initiate various reconfigurations that may influence performance, such as server allocation. A reconfiguration may be automatically performed or performed responsive to a request from man agent device, such as agent device 130. An agent-initiated reconfiguration may require an authorization of the agent or agent device.

Client 2 system 104 includes an equipment resource 134 that may be configured to generate outputs. For example, equipment resource 134 may (for example) process inputs (e.g., parts, materials and/or input data) to generate a tangible product (e.g., a manufactured or assembled part) or intangible result (e.g., quantitative characterization of a sample or part, biological metric, environmental data, wireless signal characteristics, and so on). A sensor resource 136 can be configured to generate readings corresponding to an operation of equipment resource 134, such as an operating temperature and/or energy being used. A processing resource 138 can send instruction communications to equipment resource 134, which can control an operation of the equipment resource (e.g., to define inputs, identify types of processing and/or indicate when the resource is to operate). Processing resource 138 may determine such instructions in response to processing requests for particular outputs. Processing resource 138 may further or alternatively assess data corresponding to operation of equipment resource 134 (e.g., characteristics of output data, efficiency of product and/or sensor readings) to determine whether an alert condition is satisfied. In some instances, processing resource 138 operates so as to schedule operations at one or more equipment resources 134, schedule request processing and/or coordinate process control (e.g., via assessment of sensor measurements).

Agent device 140 may provide operation parameters and/or gain access to data. For example, an operation parameter may include or at least partly define a part of a workflow that is to occur (e.g., at least partly via equipment resource 134) as part of a processing of a request. In some instances, a local or remote security resource verifies that a particular agent device or corresponding agent is authorized to provide such parameters and/or gain access.

Virtual client system 106 includes various resources for a system that are, for example, operating in the cloud. In some instances, part or all of virtual client system 106 is identified as being or being used for or by an on-site sub-system (e.g., first sub-system 110 and/or second sub-system 112). A component may, but need not, be shared across two or more sub-systems. In some instances, part or all of virtual client system 106 corresponds to a separate sub-system from one, more or all on-site sub-systems. In some instances, virtual client system 106 includes multiple sub-systems.

In the depicted instance, virtual client system 106 includes a data storage resource 142, which may include databases and/or data stores for a client. The databases and/or data stores may be configured to facilitate periodic updating and/or retrieving data in response to queries generated and coordinated by a query resource 144. For example, a data store can include content objects managed by content management resource 118, and query resource 144 can be configured to generate a query for content objects from an external source (e.g., a source system 146). As another example, a data store can include historical operational data of one or more equipment resources 134 for client 2 system. As yet another example, a data store can include data corresponding to requests for particular types of outputs of equipment resource 134, such that queries of the data store (e.g., as performed using query resource 144) can be used to control operation parameters of equipment resource 134 to facilitate responsiveness to the requests.

A usage monitor resource 148 can generate data logs corresponding to (for example) incoming communications, internal system performance (e.g., of content retrieval or equipment operation) and/or system communications. For example, usage monitor 148 can generate and maintain a data log assessed by performance monitor resource 128 based on monitoring of requests and request responses processed by content management resource 118. As another example, usage monitor 148 can generate and maintain a data log of a quality metric and/or of maintenance events corresponding to equipment resource 134. As yet another example, usage monitor 148 can generate and maintain a data log of sensor measurements collected by sensor resource 136.

Another security resource 150 can assess system access requests, usage patterns, and/or system events to monitor for security threats. For example, a frequency, source and/or request content of content-object requests may be assessed. As another example, a data log is assessed to determine whether any patterns, trends and/or log-element frequencies are indicative of a security threat. As yet another example, security resource 150 may monitor equipment operation or agent instructions to determine whether any operations or instructions are atypical from one or more characteristics of previous instructions or correspond to satisfaction of an alert indication. When security resource 150 detects a potential threat decision, it may trigger an alert to be transmitted to an agent device, such as agent device 122, agent device 140, or an external agent device 152.

An allocation resource 152 can control which cloud resources are allocated to a given client, client sub-system, task performance, and so on. For example, allocation resource 152 can control allocation of memory, data stores (e.g., network attached storage), processors, and/or virtual machines.

Figure 2:
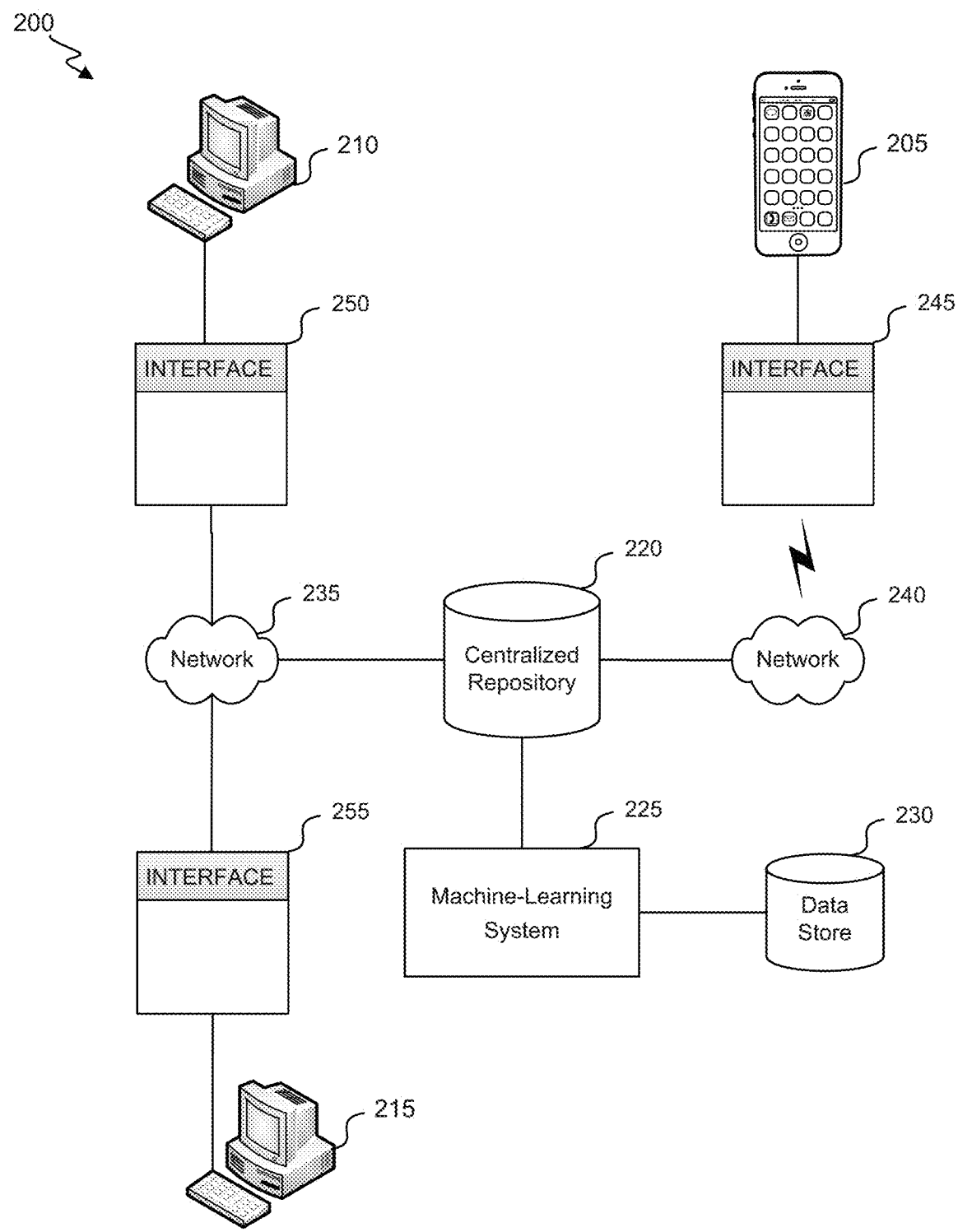
FIG. 2 shows a simplified block diagram of a machine-learning network environment.

FIG. 2 shows a simplified block diagram of a machine-learning network environment. As illustrated in the example of FIG. 2, network environment 200 includes user devices 205, 210, and 215. While the illustration of FIG. 2 shows user device 205 as a smartphone and user devices 210 and 215 as desktop computers, it will be appreciated that any number of user devices of any type can be included in network environment 200. In some instances, a user device can be operated by a user (e.g., an employee) associated with an entity (e.g., an employer). Further, user devices 205, 210, and 215 can be configured to connect to a network (e.g., networks 235 and/or 240) in order to transmit one or more data objects to centralized repository 220. In some instances, a user device may communicate with centralized repository 220 using one or more interfaces (e.g., interfaces 245, 250, and 255). In some instances, interfaces 245, 250, 255 are the same interface that facilitates a connection to centralized repository 220. In other instances, interfaces 245, 250, and 255 are different from each other, and in some cases, may be different according to security credentials of a user operating the connected user device. For example, interface 245 may include more functionality than interface 250 if the user operating user device 205 has a higher authorization level than the user operating user device 210.

Centralized repository 220 may include one or more servers in communication (wired or wireless) with one or more data stores. Further, centralized repository 220 may be a network location that stores all of the various data objects received from user devices (via an interface, such as an interface administered by an entity). For example, if 10,000 users are associated with an entity, some or all of the 10,000 users may submit various data objects using one or more interfaces. Once a data object is transmitted from a user device, the data object can be sent through one or more networks to be stored at centralized repository 220. In some instances, a datastream may be transmitted to centralized repository 220. For example, the datastream can include a plurality of data objects. Data objects can continuously be received and stored at centralized repository 220 as the data objects are generated and transmitted by user devices. The plurality of data objects stored at centralized repository 220 can be stored as a data set for generating machine-learning models. In some instances, the data set can be used for training a supervised learning machine, and in others, for determining correlations between data objects using an unsupervised learning machine. For example, correlations between nodes in a machine-learning model can be represented by correlation coefficients, which represent a dependence between at least two nodes.

Machine-learning system 225 can include one or more servers and/or computing devices that are configured to execute one or more machine-learning algorithms using the data set stored in centralized repository 220. The one or more machine-learning algorithms, decision trees, workflows, and/or models can be stored at data store 230. Data store 230 can also store data generated by or for the entity (e.g., usernames, departments, projects, positions, etc.). Non-limiting examples of machine-learning algorithms or techniques can include artificial neural networks (including backpropagation, Boltzmann machines, etc.), bayesian statistics (e.g., bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised or unsupervised). For example, machine-learning system 225 can retrieve one or more machine-learning algorithms stored in data store 230 to generate an artificial neural network in order to identify patterns or correlations within the data set. As a further example, the artificial neural network can learn that when a data object (in the data set) includes value A and value B, then value C is predicted as relevant data for the user who originally transmitted the data object. In yet another example, a support vector machine can be used either to generate output data that is used as a prediction, or to identify learned patterns within the data set.

As yet another example, machine-learning system 225 can include a tree-learning model, in which observations are mapped to determine which future state has the highest likelihood of connecting with the current state based on information included in the data object. The tree-learning model may be configured with two assumptions: 1) it may be assumed that a user who has initiated a process associated with a particular event (e.g., a travel plan, an incurred expense, a hotel reservation, a meal expense at a restaurant, and so on) will transmit at least one data object, and if so, what values may be included in the data object, and/or 2) it may be assumed that the user will submit a data object that includes one event in each category of a plurality of categorized event types (e.g., travel, lodging, dining, and so on), and if so, which values have previous users submitted for each event type.

Interfaces 245, 250, and 255 may be configured to receive inputs from user devices. Further, interfaces 245, 250, and 255 may be operated and administered by an entity. For example, interface 245 can enable a user operating user device 205 to submit one or more data objects to be processed and/or stored in centralized repository 220. Examples of a data object can include an expense report or receipt that includes one or more expenses incurred by the user during work-related travel. The data object can include one or more events (e.g., incurred expenses). For example, a data object may include a receipt for a dinner, a receipt for a hotel stay, and a receipt for a flight expense. In some cases, a data object may not include an expense report, but rather, a request to define an event with anticipated expenses. An event can have one or more event parameters (e.g., location of the hotel, price of the dinner, price of the flight, destination city of the flight, etc.). Further, event parameters of various events can be classified into one or more event types (e.g., hotels, flights, meals, transportation, etc.). The various data objects received from user devices over time can be collected and stored as a data set. One or more machine-learning algorithms can be executed using the data set to generate a machine-learning model that can provide recommendations (e.g., for schedules, hotels, restaurants, etc.) and other supporting information (e.g., documents outlining policies of the entity) to users in response to data objects received from user devices.

The interface can enable a user to transmit a request to initiate a process associated with an event. A request to initiate a process can include a request for an offset of incurred expenses, and/or a request to define (e.g., reserve) a future event, such as a flight). Based on the machine-learning model, the data set, user feedback, and/or third party data (e.g., information from a third party, different from the entity), the interface can to help the user to make more intelligent decisions when booking work-related travel or when requesting offsets. For example, when a user device transmits a data object, the interface can provide that user with information regarding other users' experiences traveling to, for example, a specific destination. As another example, the machine-learning model can be used to provide the user with a ranked list of the most popular hotels in the destination city and feedback from the users (who previously stayed at the hotels) by applying machine-learning techniques to data objects previously received from users.

In some examples, the machine-learning models can be used to identify supporting documents or information associated with events. For example, if an event corresponds to a hotel booking, the machine-learning models can be used to identify one or more documents outlining the entity's policy and/or procedures for requesting an offset. Further, based on machine-learning analysis, metadata associated with the event can be automatically identified and presented on the interface. Examples of metadata associated with the event can include the weather of a destination city, transportation schedules, links to reviews, other supporting information. Advantageously, the user does not have to submit a request for the supporting information (e.g., procedure documents, transportation schedules) or independently conduct research for the supporting information, but rather, the supporting information is automatically identified using the machine-learning models and presented to the user. In some examples, if there is particular supporting information that is frequently associated with data objects that have been previously submitted, those correlations can be used to predict future correlations. For example, if a data object includes a transportation event using a particular method (e.g., train), the supporting information can include travel schedules associated with the particular method of travel (e.g., train schedules).

In some examples, when a user device transmits a particular data object, one or more variables (e.g., data fields within the data object) can be correlated to a set of stored data objects. The supporting information associated with the set of stored data objects can be used to identify supporting information that is specific to the particular data object. In some instances, output data can be retrieved from the machine-learning model in real-time. For example, if user device 205 is travelling, a current location of the user device can be identified and supporting information associated with the current location can be retrieved (e.g., nearest cheapest restaurant). In some examples, the machine-learning model can be used to identify that traffic data should be provided to the user based on the user's location. In these examples, the traffic data can be retrieved from one or more third-party systems and the presented on the interface of the user device operated by the user.

In some examples, the machine-learning model can be used and applied in a social network context. As an example illustration, a first user device operated by a first user can transmit a first data object indicating a particular event (e.g., a reservation for a future flight). Further, a second user device operated by a second user can transmit a second data object indicating the same particular event. The machine-learning model and/or one or more rules can be used to identify that the first user and second user transmitted a data object for the particular event. Further, each of the first user device and the second user device can receive an alert message indicating that another user transmitted a data object for the particular event. The first user and the second user may or may not be associated with the same entity. In some examples, a user can transmit a data object, and that data object can used to generate an inference that the user may be interested in coordinating aspects of the event (e.g., schedules) with another user. In these examples, the data object can be mapped to the machine-learning model to generate the inference, or the data object can be used to query entity data stored in data store 230 for an identification of other users associated with the generated inference. As another example, the centralized repository 220 can receive a first data object for a first event from a first user device and a second data object for a second event from a second user device. The system can identify that the first event and the second event are within a defined vicinity of each other, which would indicate that the first user and the second user are near each other. The system can transmit notification messages to each of the first user device and the second user device indicating that the first user and second user are nearby. In this example, even though the first event and the second event are different events, the first user and the second user can still be notified that the other is nearby. Further, the notification message can include attributes of each user (e.g., position, department), which can be retrieved from the data store associated with the entity. In some instances, the interface can enable a user to query for an identification of any other users associated with a particular event.

In some examples, a plurality of data objects can be passed into one or more machine-learning algorithms determine shared characteristics or attributes between users associated with the entity. For example, the one or more machine-learning algorithms can include a clustering technique applied to the plurality of data objects to identify groups of users that share a particular attribute. The shared characteristics or attributes may or may not be related to the events corresponding to stored data objects. In another example, a user can upload a document to a data store during or after the occurrence of an event. The machine-learning model can learn that the uploaded document is associated with the event, such that if a future request to initiate a process for that event is received at a later time, the uploaded document may become accessible to the user who transmitted the future request. For example, the uploaded document may include a schedule for a shuttle associated with a hotel. Whenever a user transmits a request to book a room at that hotel at a later time after the document has been uploaded, the system can compare the user's flight information with the shuttle schedule to recommend specific travel times or schedules. In this example, the system can retrieve specific data items from the data store (e.g., the uploaded document and the flight information) and generate a plan using the data items. The system can also generate a plan by retrieve data items from the data store and by retrieving third data (e.g., public transportation schedules).

In some examples, the system may append metadata to identified supporting information in order to provide additional information and/or provide complementary information to the supporting information. For example, a particular data object may only include a vendor name and an event value (e.g., expense value). In this example, supporting information may include a document outlining how the user can obtain an offset for the event value. Additionally, metadata corresponding to the vendor name can be retrieved. For example, the metadata can include a phone number for the vendor, an address for the vendor, a website for the vendor, and so on. In some cases, the metadata may include an indication that event values of other users who visited the vendor (e.g., restaurant) have frequently exceeded a defined threshold (e.g., a per diem provided by the entity). In some examples, the interface can receive an input (from a user device), and the input can correspond to an indication that the user is planning to book a future event. Further, the interface can receive an input corresponding to an approximate location of the event. The interface can also receive an input corresponding to a purpose of the event (e.g., business meeting, conference, client interaction, etc.). The purpose of the event may identify a particular client, and if so, then client metadata can be retrieved and used to restrict the subsequent event options (e.g., restricting the hotels to choose from) or to provide additional information, such as entity documentation corresponding to the client (e.g., client preferences or attributes).

Figure 3:
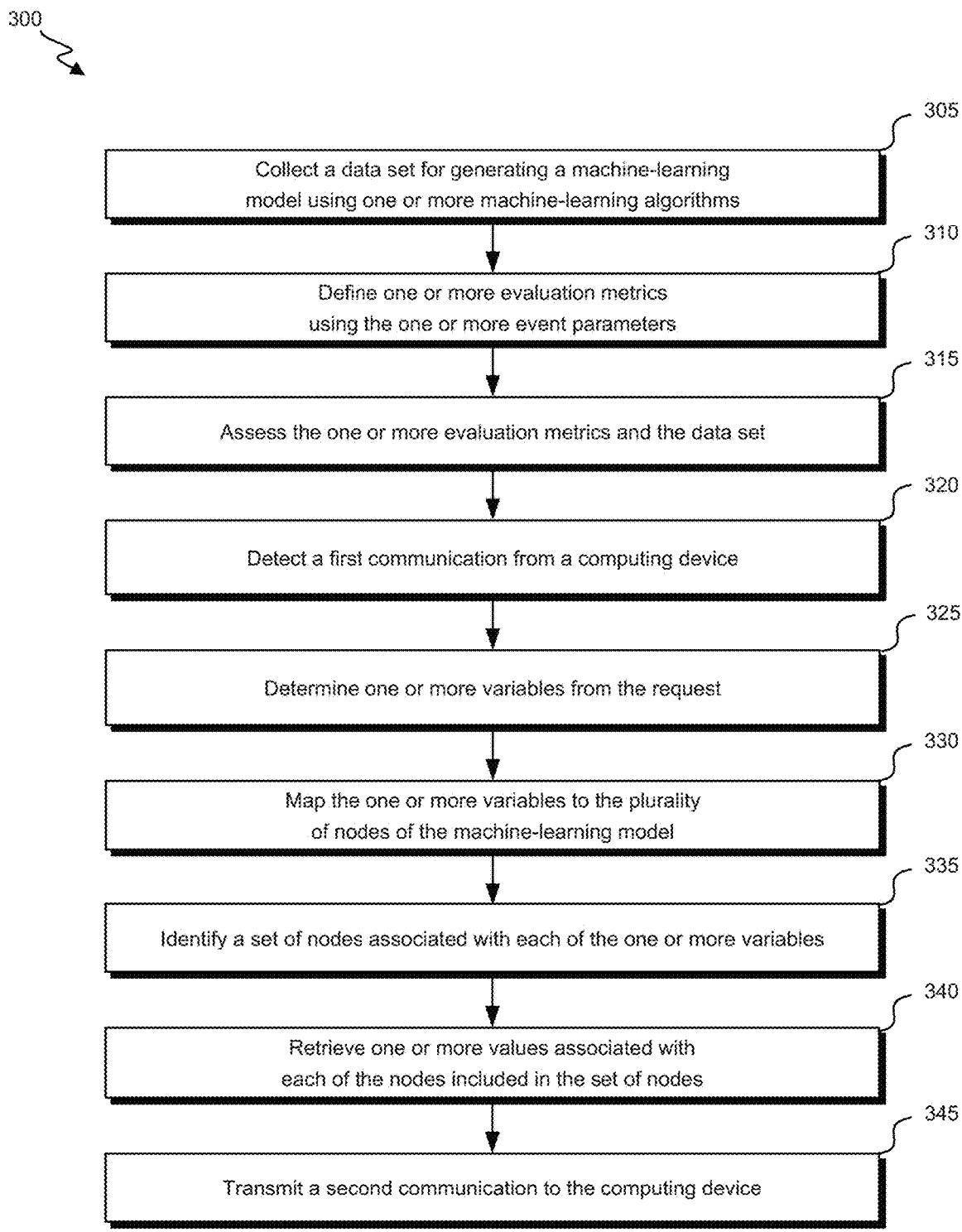
FIG. 3 is a flowchart illustrating a process for determining correlations within a data set using machine-learning algorithms.

FIG. 3 is a flowchart illustrating process 300 for determining correlations with data sets using machine-learning algorithms. Process 300 can be executed at one or more servers (e.g., machine-learning system 225). Further, process 300 can enable a user to initiate a process for an event. For example, the initiating a process for the event can include requesting an offset for the event (e.g., when the event has previously occurred) or requesting supporting information associated with the event (e.g., when the event may occur at a future time). Process 300 begins at block 305, where a data set for generating a machine-learning model is collected. The machine-learning model may be generated using one or more machine-learning algorithms. For example, the data set can include one or more events (e.g., an incurred expense, flight reservation, booked hotel, paid meal, etc.) that have previously occurred. Each event of the one or more events can include or correspond to one or more event parameters that identify a characteristic of the event. Examples of an event parameter can include a location of the event (e.g., destination city of a flight), a vendor name associated with the event (e.g., restaurant name), a date and time of the event (e.g., time of the expense), distance of an event (e.g., travel distance when travelling by train or bus), and other suitable parameters of an event.

At block 310, one or more evaluation metrics can be defined using the event parameters. An evaluation metric can be used to classify the one or more events into an event type using the event parameter. Examples of event types can include hotels, flights, restaurants, conference fees, transportation costs, and so on. For example, an event can be classified as a flight automatically or manually. In this example, if automatically, the event parameter of a travel distance can be used to classify an event as a flight. Advantageously, the classifications of the event types facilitates the generation of the machine-learning model because the classified event types can represent important characteristics to be evaluated when generating the correlations within the data set. The training of the learning machine can be based on the classifications defined at this step.

At block 315, the data set and the evaluation metrics may be assessed. In some instances, assessing the data set and the evaluation metrics includes determining or identifying correlations between data objects within the data set. For example, assessing the data set and the evaluation metrics can include executing the one or more machine-learning algorithms to generate the machine-learning model. The one or more machine-learning algorithms may relate to unsupervised learning techniques, however, the present disclosure is not limited thereto. Supervised learning techniques may also be implemented. Further, executing the one or more machine-learning algorithms generates a plurality of nodes and one or more correlations between at least two nodes of the plurality of nodes. For example, the one or more machine-learning algorithms can include unsupervised learning techniques, such as clustering techniques, artificial neural networks, association rule learning, and so on.

Each node can represent a value associated with an event and have a corresponding weight. For example, if a classified event type is a hotel, the various nodes of the hotel event type could include the different hotels that were included in the collected data set. In some cases, a node can be represented by a hierarchical tree structure including root nodes, non-leaf nodes, and leaf nodes. A first node may correspond to a first hotel (e.g., a value of the first node) and a second node may correspond to a second hotel (e.g., a value of the second node). Further, for example, each node can be assigned a weight that corresponds to a frequency of occurrences of the particular hotel. If the data set includes more events associated with the first hotel than the second hotel (e.g., users have previously booked more rooms at the first hotel than at the second hotel), the weight assigned to the first node may be higher than the weight assigned to the second node. The weights of each node can be evaluated when making recommendations or predictions to users requesting to initiate a process for a future event. For example, if a user transmits a request book a hotel room via the interface, the interface can display a ranked list of the different nodes of the hotel event type. The ranking may be based on the weight of the node. Further, in some cases, only a defined number of recommendations or predictions may be presented to the user. For example, only the nodes with the top five largest weights may be presented to the user via the interface as options for booking hotel rooms, even if there are more than five nodes in the hotel event type.

At block 320, a first communication can be detected at the system (e.g., the centralized repository and/or a server in communication with the centralized repository). The first communication can be originally transmitted by a user device (e.g., user device 205) operated by a user. It will be appreciated that any the first communication can be transmitted from any computing device by any individual on behalf of the user. The first communication can be associated with the user operating the user device. For example, the user device can display an interface (e.g., interface 245) and the interface can be configured to receive an input from the user. The input received at the interface can correspond to a request to initiate a process associated with a particular event. Examples of the a request to initiate a process associated with an event can include a request to define an event (e.g., reserving a flight, booking a hotel room, reserving a seat at a restaurant, etc.), a request for an offset for an event (e.g., at a restaurant), a request for entity documentation relating to the event (e.g., an entity's reimbursement policy and/or procedure documents), and so on. The request to initiate a process associated with a particular event can include a request to define the particular event (when the particular event has not occurred yet) or a request for an offset for an expense incurred during the particular event (when the particular event has previously occurred). The input can also include information about the particular event (e.g., time, destination, vendor name, purpose, etc.). For example, the first communication can include an actual (e.g., previously incurred) or anticipated expense or cost. The first communication can be submitted to and/or received at an expense or cost tracking/approval system that tracks or manages expenses associated with various users (e.g., employees) in the system. It will be appreciated that a request may be associated with more than one particular event. For example, the request can be a request to initiate a process for a first event (e.g., a flight), a second event (e.g., a hotel reservation), and a third event (e.g., a dinner reservation for a client dinner).

At block 325, one or more variables can be determined from the request. In some instances, a variable can represent a characteristic of the particular event. For example, if the particular event was a hotel reservation at a future date, variables of the request associated with the particular event may include the location of the hotel, the dates of the requested stay at the hotel, the name of the hotel, an event type (e.g., a hotel versus a flight), and so on. In some cases, the variables of the request may include an indication of whether the request is to initiate a process for a previously-occurred event or for a future event. If the request corresponds to more than one particular event, at least one variable can be determined for each event. Further, the data representing the variables can be included in various data fields of the input using the interface.

At block 330, each of the one or more variables can be mapped to the machine-learning model. Mapping can include comparing or matching a variable of the particular event with some or all of the plurality of nodes. For example, if the particular event represents a flight to San Francisco, mapping can include identifying whether there exists a node of the plurality of nodes that represents San Francisco as a destination city. If so, the corresponding weight and any correlated nodes (described in more detail at block 335)

associated with the node can be identified. Mapping the particular event to some or all of the plurality of nodes may result in the identification of nodes that are correlated to the node representing the particular event.

At block 335, one or more nodes can be identified from amongst the plurality of nodes. Identifying the one or more nodes can be based at least in part on the mapping at block 330. Further, the one or more nodes that are identified can be associated with each of the one or more variables determined from the request. The one or more nodes can be identified using the one or more correlations determined from the machine-learning algorithms executed using the data set. For example, the one or more nodes identified would be the nodes that are correlated to the node representing the particular event. As only a non-limiting example, if the particular event is a hotel reservation, which is represented by a node in the machine-learning model, the node may be correlated to three other nodes (a first node, a second node, and a third node). The first node may represent a restaurant, the second node may represent a transportation method, and the third node may represent a set of entity documents outlining a procedure for obtaining an offset related to the transportation method. The node representing the particular event may be correlated to the first node because the machine-learning algorithms (executed using the collected data set) identified that users associated with the entity and who stay at the hotel also typically eat at the restaurant. The node may be correlated to the second node because the machine-learning algorithms identified that users who stay at the hotel also typically take a taxi to reach a destination. Lastly, the node may be correlated to the third node because users who stay at the hotel also typically request entity documents outlining how to obtain an offset for the costs of taxi transportation.

In some cases, weights can also be used to identify the one or more nodes at block 335. As discussed above, a node of the machine-learning model can represent a value associated with an event and can have a corresponding weight. The weight can be generated using one or more machine learning algorithms. In some cases, the weight can correspond to a number of users who were previously associated with the event (e.g., how many users previously stayed at a particular hotel, how many users have flown to San Francisco, etc.). In some cases, the weight can be generated at least in part based on user feedback (e.g., if users associated with an entity provided negative feedback for a particular restaurant, the weight of the node representing the restaurant may be low so that the restaurant is not recommended to future employees travelling to the area near the restaurant). The system may select or identify one or more nodes at block 335 when the one or more nodes each have a weight that is above a defined threshold. Alternatively, the selected or identified nodes can have weights below a defined threshold. As another example, the machine-learning model may include a correlation between the node representing a hotel and one or more restaurants. The machine-learning algorithms may have identified that users who have stayed at the hotel typically also eat at the one or more restaurants, and this may be represented as a correlation between nodes in the machine-learning model. In some instances, a restaurant that is frequently visited near the hotel may have a higher weight than a restaurant that is not frequently visited. In this example, each of the one or more restaurants correlated to the hotel may also be represented by a node in the plurality of nodes. The weight of the nodes can be used to rank the restaurants.

In some cases, where a set of nodes is identified, metadata identified based on information included in the request (e.g., information indicating a purpose of the event) can be used to restrict the set of nodes to a subset of nodes. For example, the information indicating the purpose of the event may include a client identifier (e.g., representing a visit to a particular client). In this case, metadata associated with the client identifier (e.g., client variable) may be retrieved and applied to one or more rules. As an example, the metadata may indicate that the client does not provide offsets for taxi expenses. Continuing with the above example, even though 3 nodes are identified as being correlated to the node representing the particular event, the second and third node may not be included in the set of nodes because the client does not provide offsets for taxi expenses. A notification including this information may be transmitted to the user device that transmitted the request.

At block 340, one or more values associated with each node of the one or more nodes may be retrieved. Using the example above, if the one or more nodes included the first node, the second node, and the third node, a value representing each node may be retrieved. For example, a value may identify information about the node. For example, the value representing the first node may include a name of the restaurant, the value representing the second node may represent a name of a taxi company, and the value representing the third node may include links to one or more entity documents. It will be appreciated that metadata can be retrieved to supplement the value retrieved. For example, the name of the restaurant can be retrieved from a data store (e.g., administered by the entity), and metadata associated with the restaurant can be retrieved from another source to identify a phone number or an address of the restaurant, and/or directions to the restaurant. Third party systems may be accessed to retrieve or generate the supplementing metadata.

At block 345, a second communication can be transmitted to the computing device. The second communication can be responsive to the first communication. Further, the second communication can include at least one of the retrieved one or more values. Using the example above, the second communication can include the restaurant name, the taxi name, and the links to the entity documents. The data included in the second communication may be presented on the interface that is displayed on the user device.

Figure 4:
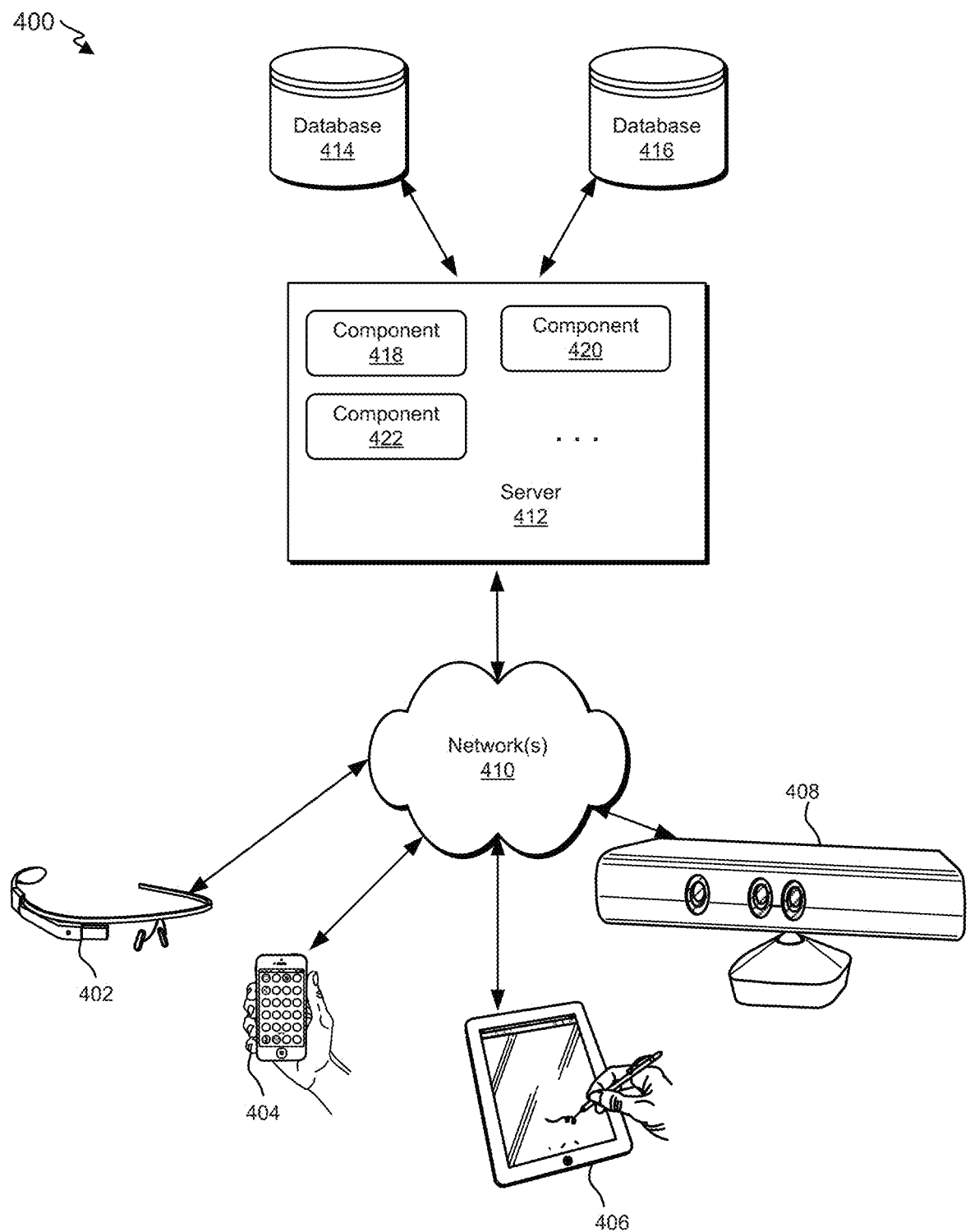
FIG. 4 depicts a simplified diagram of a distributed system for implementing one of the embodiments.

FIG. 4 depicts a simplified diagram of a distributed system 400 for implementing one of the embodiments. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications provided by one or more of the components of the system. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in the figure, the software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in the figure is thus one example of a distributed system for implementing an embodiment system and is not intended to be limiting.

Client computing devices 402, 404, 406, and/or 408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 402, 404, 406, and 408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 410.

Although exemplary distributed system 400 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 410 can be a local area network (LAN), such as one based on Ethernet, Token-Ring and/or the like. Network(s) 410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 412 may be adapted to run one or more services or software applications described in the foregoing disclosure. For example, server 412 may correspond to a server for performing processing described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. Databases 414 and 416 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle, that are adapted to store, update, and retrieve data in response to SQL-formatted commands.

Figure 5:
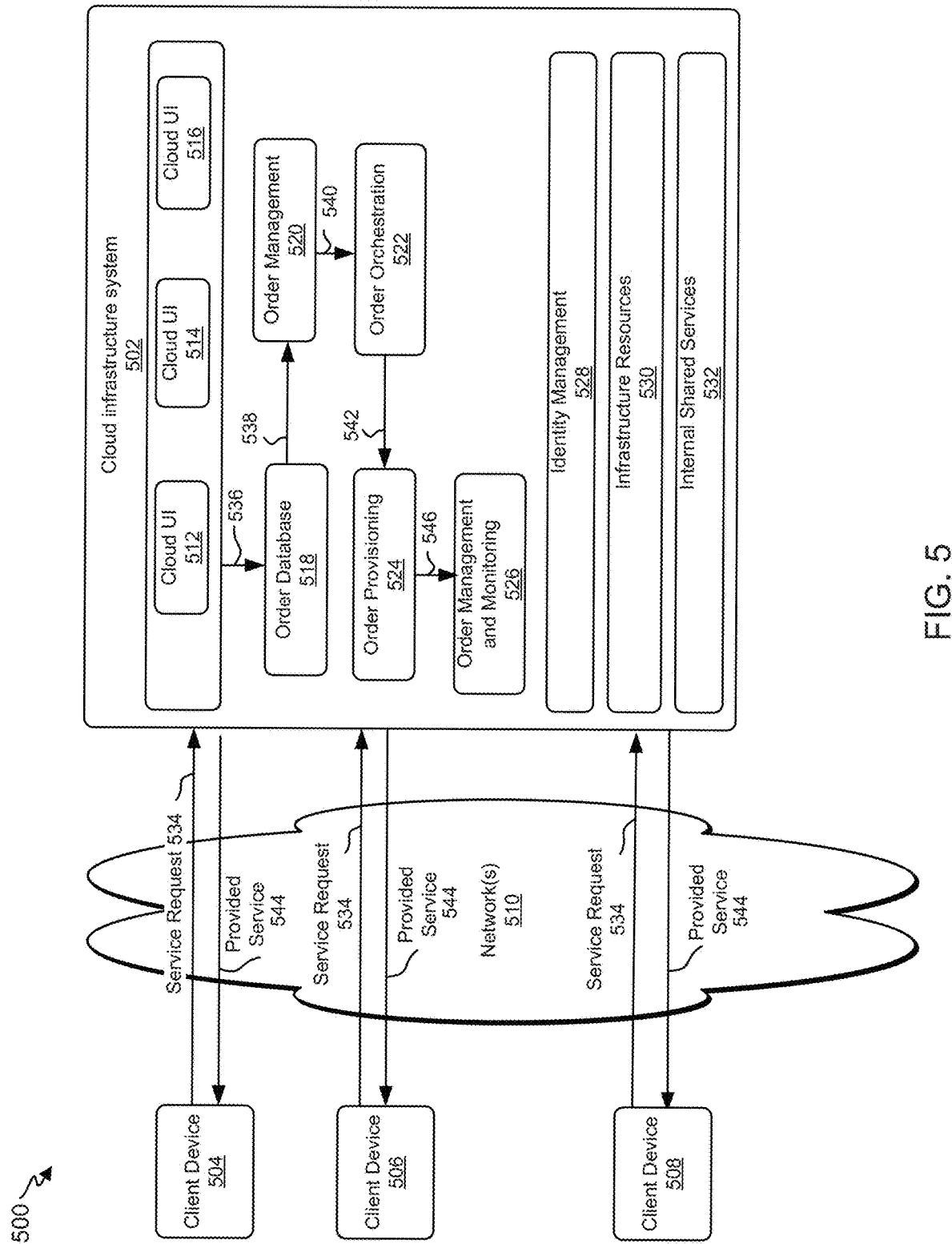
FIG. 5 is a simplified block diagram of components of a system environment by which services provided by the components of an embodiment system may be offered as cloud services, in accordance with an embodiment of the present disclosure.

FIG. 5 is a simplified block diagram of one or more components of a system environment 500 by which services provided by one or more components of an embodiment system may be offered as cloud services, in accordance with an embodiment of the present disclosure. In the illustrated embodiment, system environment 500 includes one or more client computing devices 504, 506, and 508 that may be used by users to interact with a cloud infrastructure system 502 that provides cloud services. The client computing devices may be configured to operate a client application such as a web browser, a proprietary client application (e.g., Oracle Forms), or some other application, which may be used by a user of the client computing device to interact with cloud infrastructure system 502 to use services provided by cloud infrastructure system 502.

It should be appreciated that cloud infrastructure system 502 depicted in the figure may have other components than those depicted. Further, the embodiment shown in the figure is only one example of a cloud infrastructure system that may incorporate an embodiment of the invention. In some other embodiments, cloud infrastructure system 502 may have more or fewer components than shown in the figure, may combine two or more components, or may have a different configuration or arrangement of components.

Client computing devices 504, 506, and 508 may be devices similar to those described above for 402, 404, 406, and 408.

Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between clients 504, 506, and 508 and cloud infrastructure system 502. Each network may be any type of network familiar to those skilled in the art that can support data communications using any of a variety of commercially-available protocols, including those described above for network(s) 510.

Cloud infrastructure system 502 may comprise one or more computers and/or servers that may include those described above for server 412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform.

In some embodiments, resources in cloud infrastructure system 502 may be shared by multiple users and dynamically re-allocated per demand. Additionally, resources may be allocated to users in different time zones. For example, cloud infrastructure system 530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 and by the services provided by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in the figure, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In exemplary operation 534, a customer using a client device, such as client device 504, 506 or 508, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI), cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 502 that the customer intends to subscribe to.

After an order has been placed by the customer, the order information is received via the cloud UIs, 512, 514 and/or 516.

At operation 536, the order is stored in order database 518. Order database 518 can be one of several databases operated by cloud infrastructure system 518 and operated in conjunction with other system elements.

At operation 538, the order information is forwarded to an order management module 520. In some instances, order management module 520 may be configured to perform billing and accounting functions related to the order, such as verifying the order, and upon verification, booking the order.

At operation 540, information regarding the order is communicated to an order orchestration module 522. Order orchestration module 522 may utilize the order information to orchestrate the provisioning of services and resources for the order placed by the customer. In some instances, order orchestration module 522 may orchestrate the provisioning of resources to support the subscribed services using the services of order provisioning module 524.

In certain embodiments, order orchestration module 522 enables the management of business processes associated with each order and applies business logic to determine whether an order should proceed to provisioning. At operation 542, upon receiving an order for a new subscription, order orchestration module 522 sends a request to order provisioning module 524 to allocate resources and configure those resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. Order orchestration module 522 may thus be isolated from implementation details, such as whether or not services and resources are actually provisioned on the fly or pre-provisioned and only allocated/assigned upon request.

At operation 544, once the services and resources are provisioned, a notification of the provided service may be sent to customers on client devices 504, 506 and/or 508 by order provisioning module 524 of cloud infrastructure system 502.

At operation 546, the customer's subscription order may be managed and tracked by an order management and monitoring module 526. In some instances, order management and monitoring module 526 may be configured to collect usage statistics for the services in the subscription order, such as the amount of storage used, the amount data transferred, the number of users, and the amount of system up time and system down time.

In certain embodiments, cloud infrastructure system 500 may include an identity management module 528. Identity management module 528 may be configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
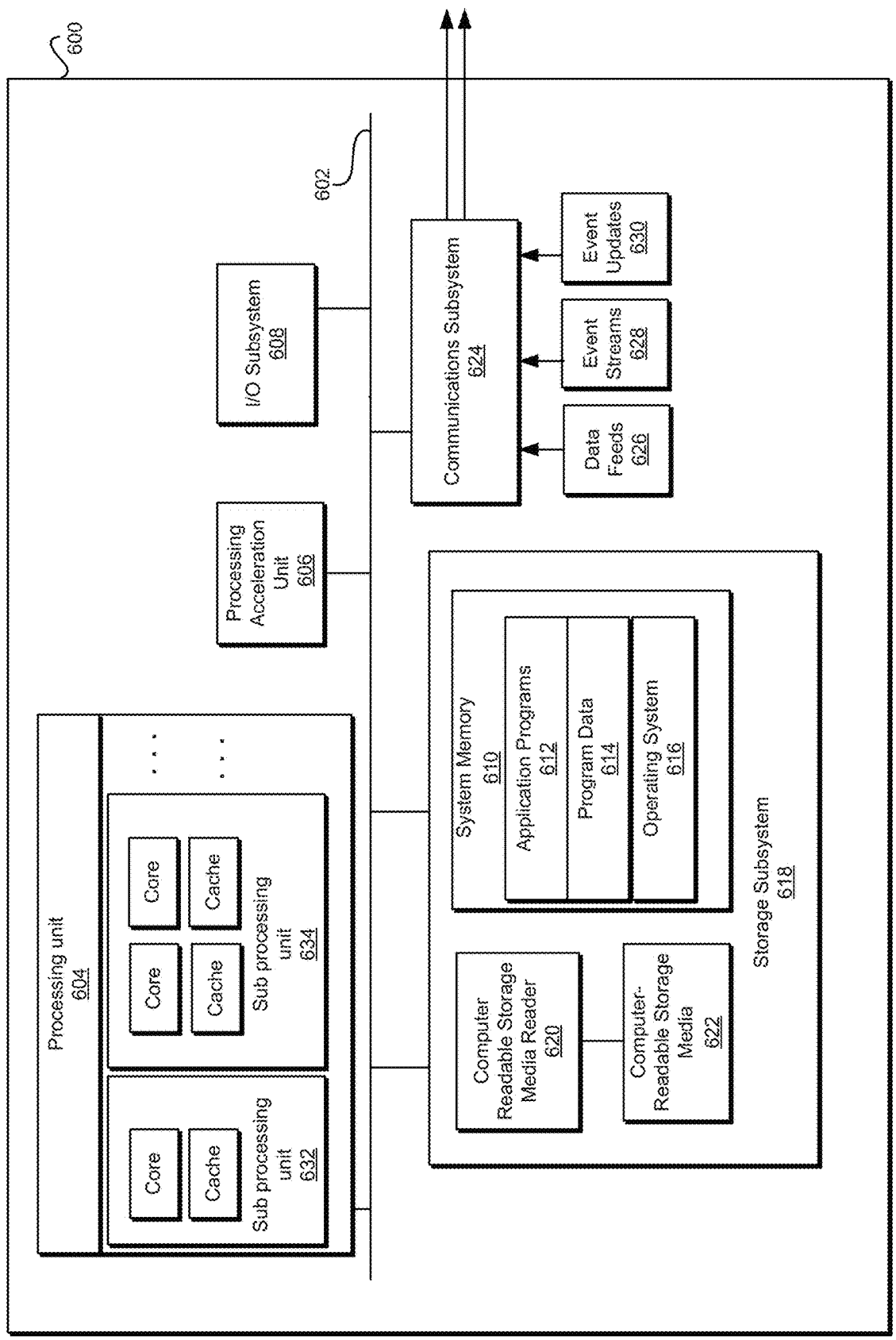
FIG. 6 illustrates an exemplary computer system, in which various embodiments of the present invention may be implemented.

FIG. 6 illustrates an exemplary computer system 600, in which various embodiments of the present invention may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 1204 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present invention.

Storage subsystem 600 may also include a computer-readable storage media reader 1220 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
    collecting, at an expense tracking system, a training data set for training a machine-learning model, the training data set representing one or more travel events that previously occurred, each travel event of the one or more travel events corresponding to an expense incurred by a user and one or more event parameters that identify a characteristic of the travel event;
    defining one or more evaluation metrics using the one or more event parameters, each evaluation metric classifying the one or more travel events into an event type;
    training the machine-learning model using the training data set, the trained machine-learning model comprising a plurality of nodes including at least a first node associated with a first event type training comprising assigning a weight to each of the plurality of nodes and generating one or more trained correlations between at least two nodes of the plurality of nodes, each node representing a value associated with a travel event of the one or more travel events, wherein each of at least one node of the plurality of nodes corresponds to a hierarchical tree structure;
    detecting a first communication from a computing device operated by a particular user, the first communication corresponding to a request to initiate a process associated with a particular travel event, the request being associated with an actual or anticipated expense, the particular travel event corresponding to the first node having a first event type, and the first communication being received at the expense tracking system;
    in response to detecting the first communication, determining one or more variables from the request, each variable of the one or more variables representing a characteristic of the particular travel event, wherein the one or more variables comprise a client variable that includes a request for a reimbursement for a portion of the actual or anticipated expense;
    in response to determining the one or more variables, accessing one or more rules associated with the client variable, wherein the one or more rules includes selecting nodes representing values associated with a travel events associated with a reimbursement action;
    mapping the one or more variables to the plurality of nodes of the machine-learning model;
    identifying, based at least in part on the mapping, one or more nodes for each of the one or more variables, the one or more nodes being included in the plurality of nodes of the machine-learning model, and the one or more trained correlations being used to identify the one or more nodes, wherein the identified one or more nodes are restricted to a subset of nodes based on the accessed one or more rules, and wherein restricting the identified one or more nodes to the subset of nodes comprises including nodes representing values associated with a travel events associated with a reimbursement action in the subset of nodes;
    retrieving one or more travel event values, each travel event value of the one or more travel event values associated with an action corresponding to an event type;
    generating, by inputting the one or more variables into the trained machine-learning model and based on the one or more travel event values, an output predicting supporting information that identifies a plurality of actions comprising one or more first actions and one or more second actions, each action of the plurality of actions having occurred in association with the particular travel event, and wherein each of the plurality of actions are of a different event type from the particular travel event and at least one action of the plurality of actions is of a second event type; and
    transmitting a second communication to the computing device, the second communication being responsive to the first communication, comprising the one or more travel event values, and identifying the supporting information.

2. The computer-implemented method of claim 1, wherein collecting the training data set is continuously performed, such that when a new travel event has occurred, the new travel event is included in the training data set.

3. The computer-implemented method of claim 1, further comprising: updating the machine-learning model when the new travel event is included in the training data set, such that at least one weight that corresponds to a node of the plurality of nodes is updated.

4. The computer-implemented method of claim 1, wherein the particular travel event corresponds to a future travel event, wherein the supporting information indicates which of the one or more first actions or the one or more second actions are recommended.

5. The computer-implemented method of claim 1, further comprising: detecting a third communication from an additional computing device, wherein the third communication corresponds to another request to initiate another process associated with the particular travel event, wherein the third communication is received after the first communication is received and before the particular travel event occurs; identifying that the first communication and the third communication each correspond to the particular travel event; and transmitting an alert message to the additional computing device, the alert message including a notification that the particular user associated with the first communication is also associated with the particular travel event.

6. The computer-implemented method of claim 5, further comprising: transmitting a fourth communication to the additional computing device, the fourth communication being responsive to the third communication.

7. The computer-implemented method of claim 5, wherein the particular user associated with the first communication and a different user associated with the third communication are each associated with a same entity.

8. The computer-implemented method of claim 1, further comprising: detecting that a particular node of the one or more nodes is associated with a predicted occurrence, the predicted occurrence corresponding to an event parameter exceeding a defined threshold; and accessing a workflow associated with the predicted occurrence, the workflow including an identification of one or more documents associated with the predicted occurrence, the one or more documents identifying a procedure for obtaining a reimbursement associated with the predicted occurrence.

9. The computer-implemented method of claim 1, wherein the particular travel event is a work-related travel event that has previously occurred in association with an entity employing the particular user, at least one node of the one or more nodes corresponds to a workflow for identifying one or more documents that identify a procedure for obtaining a reimbursement associated with the particular travel event, and the reimbursement being provided by the entity.

10. The computer-implemented method of claim 1, wherein the trained machine-learning model having been trained to detect co-occurrences, among events that have previously occurred, of two or more events having different characteristics and being of different event types, and wherein the trained machine-learning model having been further trained to detect one or more client preferences.

11. The computer-implemented method of claim 1, wherein the supporting information includes any one or more items from a group including a specific document, third-party data, a schedule, an identifier of a user, or a recommendation.

12. A system, comprising: one or more processors; and a non-transitory computer-readable storage medium containing instructions which, when executed on the one or more processors, cause the one or more processors to perform operations including:
collecting, at an expense tracking system, a training data set for training a machine-learning model, the training data set representing one or more travel events that previously occurred, each travel event of the one or more travel events corresponding to an expense incurred by a user and one or more event parameters that identify a characteristic of the travel event;
defining one or more evaluation metrics using the one or more event parameters, each evaluation metric classifying the one or more travel events into an event type;
training the machine-learning model using the training data set, the trained machine-learning model comprising a plurality of nodes including at least a first node associated with a first event type, the training comprising assigning a weight to each of the plurality of nodes and generating one or more trained correlations between at least two nodes of the plurality of nodes, each node representing a value associated with a travel event of the one or more travel event, wherein each of at least one node of the plurality of nodes corresponds to a hierarchical tree structure;
detecting a first communication from a computing device operated by a particular user, the first communication corresponding to a request to initiate a process associated with a particular travel event, the request being associated with an actual or anticipated expense, the particular travel event corresponding to the first node having a first event type, and the first communication being received at the expense tracking system;
in response to detecting the first communication, determining one or more variables from the request, each variable of the one or more variables representing a characteristic of the particular travel event, wherein the one or more variables comprise a client variable that includes a request for a reimbursement for a portion of the actual or anticipated expense;
in response to determining the one or more variables, accessing one or more rules associated with the client variable, wherein the one or more rules includes selecting nodes representing values associated with a travel events associated with a reimbursement action;
mapping the one or more variables to the plurality of nodes of the machine-learning model;
identifying, based at least in part on the mapping, one or more nodes for each of the one or more variables, the one or more nodes being included in the plurality of nodes of the machine-learning model, and the one or more trained correlations being used to identify the one or more nodes, wherein the identified one or more nodes are restricted to a subset of nodes based on the accessed one or more rules, and wherein restricting the identified one or more nodes to the subset of nodes comprises including nodes representing values associated with a travel events associated with a reimbursement action in the subset of nodes;
retrieving one or more travel event values, each travel event value of the one or more travel event values associated with an action corresponding to an event type; generating, by inputting the one or more variables into the trained machine-learning model and based on the one or more travel event values, an output predicting supporting information that identifies a plurality of actions comprising one or more first actions and one or more second actions, each action of the plurality of actions having occurred in association with the particular travel event, and wherein each of the plurality of actions are of a different event type from the particular travel event and at least one action of the plurality of actions is of a second event type; and transmitting a second communication to the computing device, the second communication being responsive to the first communication, comprising the one or more travel event values, and identifying the supporting information.

13. The computer-implemented method of claim 1, wherein: generating the output predicting supporting information is based on selecting nodes of the subset of nodes corresponding to higher weights; and the second communication further comprises the weights corresponding to the one or more travel event values.

14. The computer-implemented method of claim 1, further comprising: detecting a third communication from an additional computing device, wherein the third communication corresponds to another request to initiate another process associated with the particular travel event; identifying that the first communication and the third communication each correspond to the particular travel event; generating an inference that an additional user of the additional computing device is interested in coordinating aspects of the particular travel event with a particular user of the computing device; and sending a message comprising the inference to the computing device.

15. The computer-implemented method of claim 1, further comprising: detecting a third communication from an additional computing device, wherein the third communication corresponds to a request to initiate a process associated with an additional travel event different than the particular travel event; determining that the particular user of the computing device and an additional user of the additional computing device share a particular user attribute; identifying in real-time a first location of the computing device and a second location of the additional computing device; determining that the first location and the second location are within a predefined distance of each other; and transmitting an alert message to the computing device, the alert message including a notification that an additional user associated with the third communication is within the distance of the computing device.

16. The computer-implemented method of claim 1, wherein: the first communication from the computing device is a request to obtain a reimbursement and the one or more variables include a request for a reimbursement for a portion of the actual or anticipated expense; the second communication transmitted to the computing device includes one or more documents related to obtaining a reimbursement for the one or more travel event values in the second communication.

17. The computer-implemented method of claim 1, wherein the particular user is a first user and the particular travel event is a first particular travel event, the method further comprising: receiving a document corresponding to a second particular travel event associated with a second user, the second particular travel event being a same type of travel event as the first particular travel event and having occurred prior to the detecting the first communication from the computing device; and sending, to the first user as part of the second communication transmitted to the computing device, the document corresponding to the second particular travel event.

18. The system of claim 12, wherein the trained machine-learning model having been trained to detect co-occurrences, among events that have previously occurred, of two or more events having different characteristics and being of different event types, and wherein the trained machine-learning model having been further trained to detect one or more client preferences.

19. The system of claim 12, wherein the operations further comprise: detecting a third communication from an additional computing device, wherein the third communication corresponds to another request to initiate another process associated with the particular travel event, wherein the third communication is received after the first communication is received and before the particular travel event occurs; identifying that the first communication and the third communication each correspond to the particular travel event; and transmitting an alert message to the additional computing device, the alert message including a notification that the particular user associated with the first communication is also associated with the particular travel event.

20. The system of claim 12, wherein the operations further comprise: detecting that a particular node of the one or more nodes is associated with a predicted occurrence, the predicted occurrence corresponding to an event parameter exceeding a defined threshold; and accessing a workflow associated with the predicted occurrence, the workflow including an identification of one or more documents associated with the predicted occurrence, the one or more documents identifying a procedure for obtaining a reimbursement associated with the predicted occurrence.

21. The system of claim 12, wherein the particular travel event is a work-related travel event that has previously occurred in association with an entity employing the particular user, at least one node of the one or more nodes corresponds to a workflow for identifying one or more documents that identify a procedure for obtaining a reimbursement associated with the particular travel event, and the reimbursement being provided by the entity.

22. The system of claim 12, wherein the supporting information includes any one or more items from a group including a specific document, third-party data, a schedule, an identifier of a user, or a recommendation.

* * * * *

UNITED STATES PATENT AND TRADEMARK OFFICE
CERTIFICATE OF CORRECTION

| | |
|---|---|
| PATENT NO. | : 11,443,225 B2 |
| APPLICATION NO. | : 15/485516 |
| DATED | : September 13, 2022 |
| INVENTOR(S) | : Li Li, Xiaoyu Peng and Kehua Pan |

It is certified that error appears in the above-identified patent and that said Letters Patent is hereby corrected as shown below:

On the Title Page

Item (74), delete "Towsend" and insert --Townsend--.

In the Specification

In Column 12, Line 19, delete "the a" and insert --the--.

In Column 15, Line 48, delete "Internet" and insert --Internetwork--.

In Column 25, Line 30, delete "type training" and insert --type, the training--.

In the Claims

In Column 26, Line 29, delete "claim 1" and insert --claim 2--.

In Column 27, Line 47, delete "travel event" and insert --travel events--.

Signed and Sealed this
Fourteenth Day of March, 2023

Katherine Kelly Vidal
*Director of the United States Patent and Trademark Office*